Patented Oct. 9, 1945

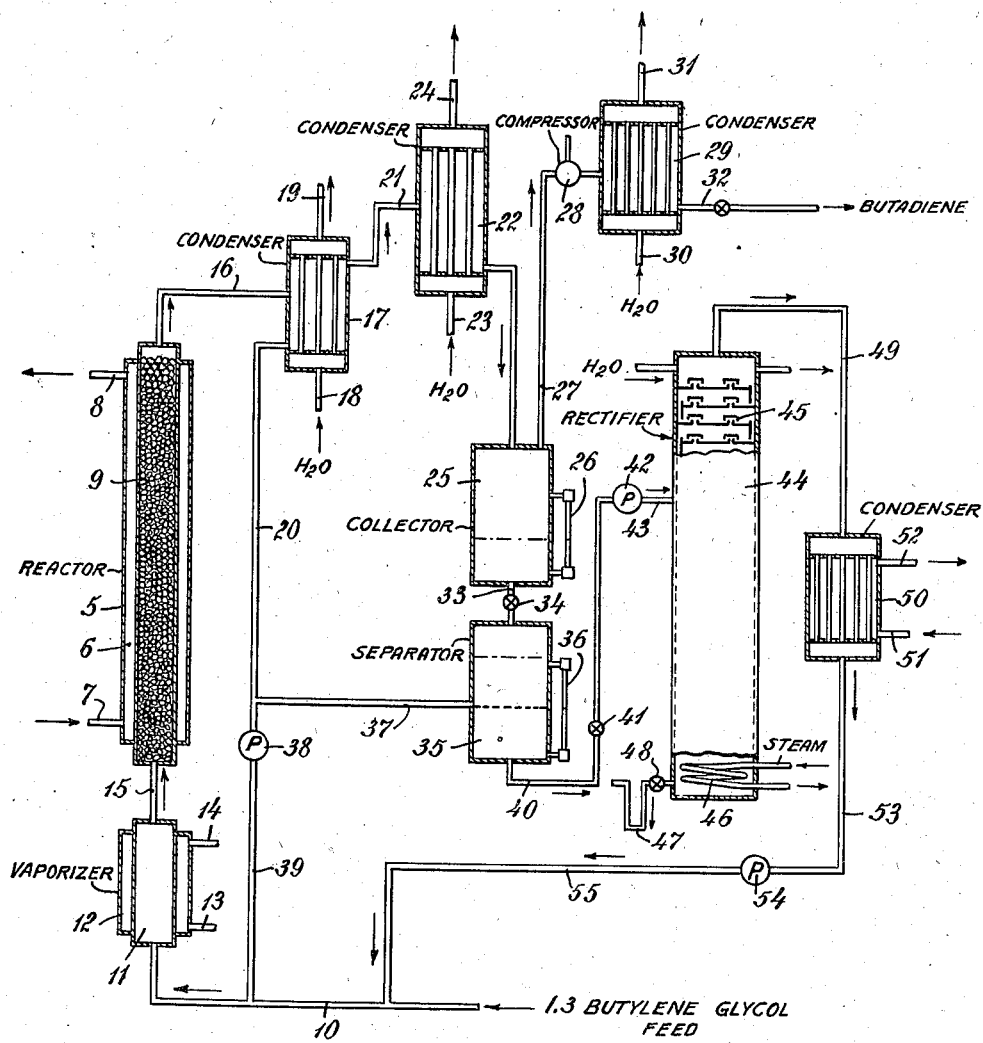

2,386,325

UNITED STATES PATENT OFFICE 2,386,325

PRODUCTION OF BUTADIENE

Arthur E. Lorch, Tenafly, N. J., assignor to Air Reduction Company, Incorporated, New York, N. Y., a corporation of New York Original application April 16, 1943, Serial No. 483,343. Divided and this application January 25, 1945, Serial No. 574,609

1 Claim. (Cl. 260—681)

This invention relates to the production of 1,3-butadiene from 1,3-butylene glycol and particularly to an improved method affording a commercially practicable procedure for economical recovery of the desired product.

1,3-butadiene is derived from 1,3-butylene glycol by splitting off water in accordance with the following reaction:

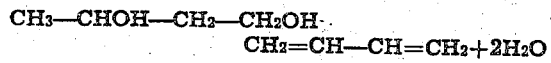

$CH_2=CH—CH=CH_2+2H_2O$

There have been suggestions heretofore for dehydration of 1,3-butylene glycol in the vapor phase by contact with a suitable catalyst, usually a phosphate of calcium or sodium, in the presence of free phosphoric acid. The latter, at elevated temperatures, is extremely active, and consequently the catalyst masses are rapidly disintegrated under operating conditions. Since it is necessary to afford space for the vapor to flow through the reactor and moreover to provide maximum surface contact between the catalyst and the vapor, disintegration of the catalyst mass rapidly reduces the efficiency of, and finally prevents continued operation because of the packing of the disintegrated material into a practically impervious layer in, the reactor.

It is the object of the present invention to prepare 1,3-butadiene from 1,3-butylene glycol in a simple, economical and efficient procedure suitable for commercial application.

Another object of the invention is the provision of a method which ensures prolonged activity of the catalyst mass and particularly avoidance of disintegration thereof, thus affording continued efficiency in operation.

Other objects and advantages of the invention will be apparent as it is better understood by reference to the following specification and the accompanying drawing, which illustrates diagrammatically an apparatus suitable for the practice of the invention.

I have discovered that butadiene can be produced advantageously by passing 1,3-butylene glycol in the vapor phase over an improved catalyst mass which is adapted to withstand the disintegrating effect of free phosphoric acid. Such a catalyst mass can be prepared readily and utilized in accordance with the present invention to materially prolong the period of efficient activity of the catalyst.

The procedure depends upon the introduction of 1,3-butylene glycol in the vapor phase to a body of the catalyst which is maintained at a suitable temperature and the continuous withdrawal of the gaseous products from which the butadiene can be readily separated. The remainder of the gaseous products can be recovered and returned for further treatment.

The catalyst body is maintained preferably at a temperature ranging from 220° to 400° C., the most effective range for the catalyst hereinafter described being approximately 280° to 320° C. The temperature may be maintained by circulating a suitable heating medium such for example as a mixture of diphenyl and diphenyl oxide known as "Dowtherm" about the catalyst body.

As the catalyst, I prefer to employ "ammonium phosphate." The term "ammonium phosphate" is employed as a general designation of the tri, di, and mono ammonium phosphates or mixtures of these salts. It is employed also to include decomposition products of these phosphates which are subject to modification when subjected to temperatures such as those employed in the method. The precise composition of the resultant salt or salts in the catalyst mass at the temperature maintained cannot be determined accurately. Any of the phosphates mentioned, or the resulting products, are active catalysts for the reaction. I have found that "ammonium phosphate" is markedly superior to the prosphate catalysts which have been mentioned in the literature concerning dehydration of 1,3-butylene glycol.

In order to attain the most effective use of "ammonium phosphate" as a catalyst for the reaction, it is desirable to mount it on a suitable support. Most of the supports commonly suggested for use in the preparation of catalyst bodies are useless for the purpose of the present invention, because they do not withstand the disintegrating effect of free phosphoric acid which is inevitably present at the temperature employed. I have discovered, however, that silica affords a satisfactory support for "ammonium phosphate" in catalyst masses to be employed for the purpose of the present invention. The preferred forms of silica which I have employed successfully for the purpose are a calcined diatomaceous earth consisting essentially of silica and generally known as "Celite V." Another preferred type is silica bonded with feldspar. Any relatively pure silica may be fritted with the addition of feldspar to produce a material adapted for use as a support which effectively withstands the disintegrating effect of phosphoric acid.

The catalyst mass may be prepared in any suitable manner. For example, the selected supporting material may be soaked in a solution of "ammonium phosphate." The excess liquid may be drained away and the wetted support may then be dried. Alternatively, a solution of "ammonium phosphate" may be added to the supporting material and the mass may be dried while it is stirred to maintain uniformity. Whatever procedure is adopted, the supporting material carrying the "ammonium phosphate" may be formed into pellets in accordance with the usual method. The pellets may be of any desired size adapted to afford maximum surface contact with the necessary interstices through which the vapor may readily pass.

The proportion of the "ammonium phosphate" in the catalyst body may be varied over wide limits. It will depend in part upon the degree and type of porosity of the supporting material as well as the size of the supported pieces. Satisfactory catalysts have been prepared covering the range of 10% to 60% ammonium phosphate. The size of the individual pieces of catalyst body can be varied within wide limits to secure the optimum contact with the reactant gases.

As the result of dehydration of the 1,3-butylene glycol, butadiene is produced admixed with unreacted partially reacted glycol. By passing the vapors through a suitable condenser at about 100° C., the unreacted glycol can be liquefied, separated and returned for further treatment. The partially reacted glycol or butenol with water and the butadiene pass the condenser. The butadiene is withdrawn and preferably is compressed and condensed by cooling to a liquid although it may be withdrawn and stored in the form of vapor. The partially reacted glycol and water resulting from the reaction are condensed to liquid which separates into two layers, one oily, containing part of the butenol, and the other watery, which also contains butenol. The oily layer can be withdrawn and returned for further treatment. The watery layer is delivered to a fractionating column. An azeotrope of butenol and water is withdrawn at the top of the column and returned for further treatment with the catalyst. Water is withdrawn at the bottom of the column.

The procedure will be readily understood by reference to the drawing, it being understood that the apparatus described is merely illustrative of suitable equipment for the purpose. The reactor 5 may be a tubular chamber of suitable material surrounded by a heating jacket 6 to which the heating fluid is introduced through a pipe 7 and withdrawn through a pipe 8. The catalyst 9 is disposed within the chamber 5 in the form of pellets of suitable size to effect the desired result.

1,3-butylene glycol is supplied through a pipe 10 to a vaporizer 11 which may be heated, for example, by passage of a suitable liquid such as "Dowtherm" through a jacket 12. The heating liquid is introduced through a pipe 13 and withdrawn through a pipe 14. The glycol is thus vaporized and delivered to the chamber 5 by a pipe 15.

The gaseous products of the reaction are withdrawn through a pipe 16 and delivered to a condenser 17 supplied with cooling liquid such as water through a pipe 18. The water escapes through a pipe 19. The condensate, consisting of unreacted glycol, is delivered by a pipe 20 to the pipe 10 and vaporizer 11.

The remaining vapors are delivered by a pipe 21 to a condenser 22 through which a cooling liquid such as water is circulated by pipes 23 and 24. The condensate is delivered to a collector 25 having a sight glass 26 whereby the level of the liquid therein may be observed. Butadiene escapes through a pipe 27, is preferably compressed by a compressor 28, and is delivered to a condenser 29. Cooling water may be introduced through a pipe 30 and withdrawn through a pipe 31. The butadiene in the liquid phase may be withdrawn through a pipe 32 and delivered to any suitable storage receptacle.

The liquid from the collector 25 is delivered through a pipe 33 controlled by a valve 34 to a separator 35 having a sight glass 36 permitting observation of the liquid levels. The liquid separates into two layers. The upper oily layer, containing part of the butenol, may be withdrawn through a pipe 37 and delivered by a pump 38 and pipe 39 to the pipe 10, where it mingles with the glycol introduced to the vaporizer 11.

The liquid in the bottom of the separator 35 is withdrawn through a pipe 40 controlled by a valve 41 and is delivered by a pump 42 and pipe 43 to a rectifier 44 having the usual plates or trays 45. The bottom of the rectifier is supplied with heat by means of a coil 46 through which any suitable heating medium may circulate. The rectification results in the separation of water at the bottom which may be withdrawn through the pipe 47 controlled by a valve 48. The azeotrope of partially reacted glycol or butenol and water escapes through a pipe 49 at the top of the rectifier and is delivered to a condenser 50. Cooling water may be introduced through the pipe 51 and withdrawn through a pipe 52. The condensed azeotrope is delivered through a pipe 53, pump 54 and pipe 55 to the pipe 10, and is thus returned for further reaction in contact with the catalyst.

The practical operation of the invention will be readily understood from the following examples:

*Example I*

A catalyst was prepared by soaking 4–8 mesh Celite V in a saturated aqueous solution of di-ammonium phosphate. The mass was drained and dried at 100° C. It was placed in the reactor and heated to a temperature of 300–320° C. A 50% aqueous solution of 1,3-butylene glycol was vaporized and passed through the catalyst. The butadiene was separated as hereinbefore described. After 80 days of operation, the catalyst had disintegrated only to the extent of about 15%. Satisfactory yields of butadiene were obtained.

*Example II*

In an operation similar to that described in Example I, I employed a catalyst composed of about 15% diammonium phosphate mounted on feldspar-bonded silica of approximately 4–8 mesh size. 75% aqueous 1,3-butylene glycol solution was vaporized and delivered to the catalyst mass at a rate of 25–35 grams per hour. After 56 days of operation, the catalyst showed only about 50% disintegration. Yields were satisfactory.

The foregoing examples are merely illustrative of various modifications which can be made in the operation of the invention. Two elements are, however, important, the use of "ammonium phosphate" as the active catalytic material and the use of a support consisting essentially of silica. The use of these elements of the invention ensures satisfactory yields and continued catalytic activity over long periods of time. The invention is limited, therefore, only with respect to the essential conditions of operation as hereinbefore set forth.

Various changes may be made in the apparatus employed and in the details of procedure without departing from the invention or sacrificing the advantages thereof.

This application is a division of my co-pending application Serial No. 483,343 filed April 16, 1943.

I claim:

The method of dehydrating 1,3-butylene glycol to produce 1,3-butadiene which comprises passing the glycol in the vapor phase over a catalyst body consisting of ammonium phosphate on an inert support composed essentially of silica in the form of feldspar-bonded silica.

ARTHUR E. LORCH.